April 9, 1963  R. C. UPTON  3,085,124
ELECTRIC FURNACE

Filed May 23, 1960　　　　　　　　　　　　　　　2 Sheets-Sheet 1

*INVENTOR.*
RICHARD C. UPTON

BY Whittemore, Hulbert & Belknap

ATTORNEYS

April 9, 1963  R. C. UPTON  3,085,124
ELECTRIC FURNACE
Filed May 23, 1960  2 Sheets-Sheet 2
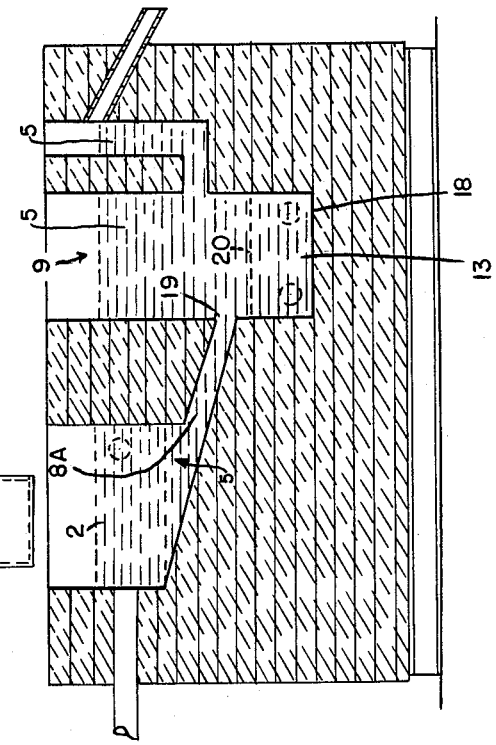
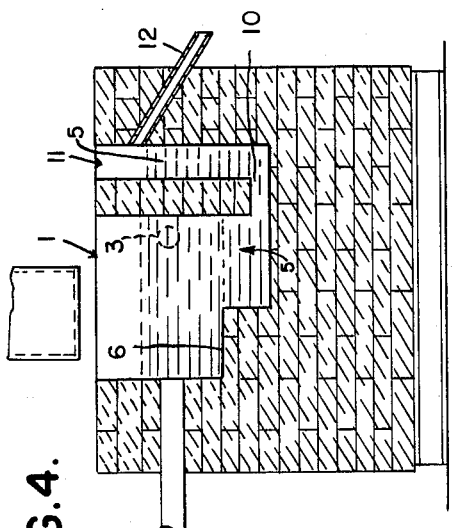
INVENTOR.
RICHARD C. UPTON
BY
ATTORNEYS

3,085,124
ELECTRIC FURNACE
Richard C. Upton, Mount Clemens, Mich., assignor to Upton Electric Furnace Company, Inc., Roseville, Mich., a corporation of Michigan
Filed May 23, 1960, Ser. No. 30,794
13 Claims. (Cl. 13—33)

The invention relates to electric furnaces, more particularly designed for the melting of metals, in which the heat is generated in a molten salt bath.

One of the objects of the invention is to provide an improved furnace for melting and pouring the metal in which the electrically heated molten salt is used to rapidly melt the metal and also to hold the metal in storage in a molten state at a desirable temperature for pouring.

Another object of the invention is to provide a means for melting the metal at a high rate by the use of a molten salt maintained at a much higher temperature than that which is desirable in the molten metal when it is ejected from the furnace.

A further object of the invention is to eject the molten metal from the furnace by means of pressure exerted upon the molten metal by the molten salt rather than by tilting the furnace to provide direct pouring or by means of any mechanical handling of the molten metal itself.

A further object of the invention is to provide means for holding the molten metal in storage prior to ejection at a lower temperature than that attained during the melting.

With these and other advantageous features in view, the invention consists in the construction as hereinafter set forth.

Figure 1:
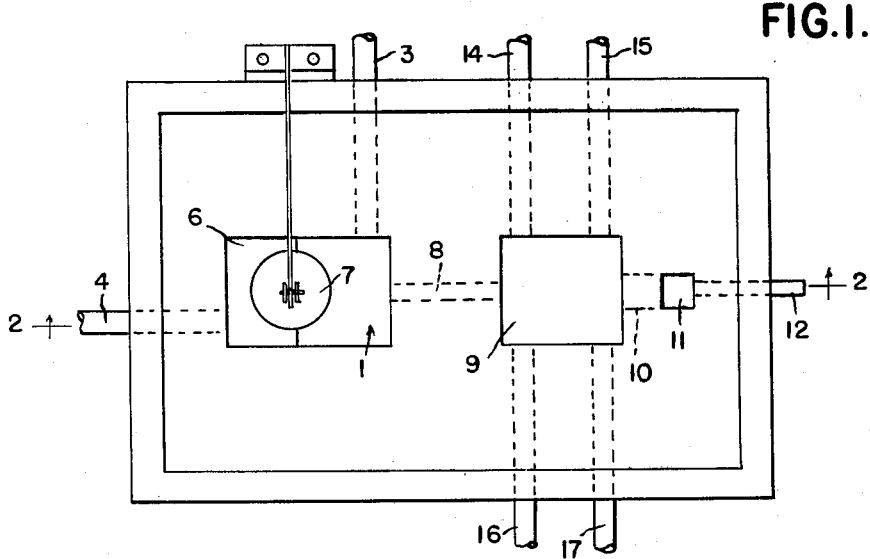
Figure 2:
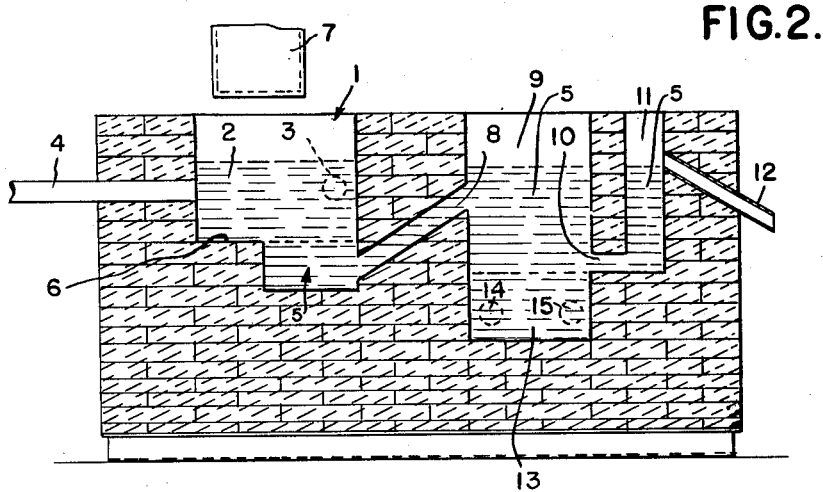

In the accompanying drawings:
FIGURE 1 is a plan view of the furnace.
FIGURE 2 is a vertical section on the line 2—2 of FIGURE 1.
FIG. 3 is a plan view of a modified furnace.
FIG. 4 is a vertical section on the line 4—4 of FIG. 3.
FIG. 5 is a vertical section through a modified furnace differing slightly from FIGURE 2.

1 is the chamber in which the metal is melted. The molten salt 2 is heated by the passage of electric current through it between the electrodes 3 and 4. The salt is selected to have a lower specific gravity than the molten metal 5 and floats on the liquid metal. The metal to be melted is dropped into the molten salt. The shelf or ledge 6 serves to support the solid metal within the molten salt rather than to allow it to sink into the already melted metal where melting would be effected by the withdrawal of heat from the molten metal. By this means the heat for melting the solid metal is supplied directly from the hotter molten salt, this being a way to effectually increase the area of surface contact of the molten salt with the metal being processed.

As soon as sufficient metal has accumulated in the bottom of chamber 1, the displacer 7 is lowered into the molten salt 2, raising its level, and hence its pressure on the surface of the molten metal 5 in chamber 1, forcing some of it through passageway 8 into chamber 9. Molten metal will also flow through passageway 10 into chamber 11 and from this chamber 11 molten metal will be ejected from the furnace through pouring tube 12. By selectively lowering displacer 7 any desired amount of molten metal may be thus ejected within the limits imposed by the sizes of the chambers 1, 9 and 11 and the size of the displacer 7 and the relative specific gravity of the salt 2 with respect to that of the metal 5.

The metal in chamber 9 floats on top of salt 13 which is of greater specific gravity than the metal and is held at proper pouring temperature by controlling the temperature of salt 13 which is heated by the passage of electric current through it between the two pairs of electrodes 14, 15 and 16, 17.

The slope of passageway 8 is upward from chamber 1 to chamber 9. This is necessary to insure that the lighter salt 2 does not mix with salt 13 if the displacer 7 should be lowered far enough to eject enough metal from chamber 1 to lower the metal level below the top of the opening of passageway 8 into chamber 1, thus allowing some of salt 2 to pass into chamber 9 where it will float on top of the molten metal in chamber 9. But if it could discharge instead into salt 13 it would mix with it and would eventually so lower the specific gravity of salt 13 that the metal in chamber 9 would no longer float on the salt but sink to the bottom and short circuit the electrodes 14, 15 and 16, 17, rendering the furnace inoperative.

Also, the passageway 10 opens near the bottom of the molten metal in chamber 9 rather than higher so as not to take the hot metal being poured into chamber 9 by passageway 8.

In the modified furnace as illustrated in FIGS. 3 and 4, the furnace is provided with two chambers instead of three, thereby eliminating chamber 9 and the inclined passageway 8 connected thereto. In the modified furnace the final chamber 11 has the passageway 10 connected directly to the lower portion of the melting chamber 1 so that the molten metal 5 can pass directly into the final chamber 11.

Although the modified form of furnace may be used successfully in many melting operations, there is an advantage in the three chamber furnace of FIGS. 1 and 2 in that it provides a means for lowering the temperature of the molten metal to that most suitable for pouring and yet permits very rapid melting by the use of a much higher salt bath temperature in the melting chamber 1.

The furnace of the present invention may be used for melting a wide variety of metals but is of great utility in connection with metals such as aluminum and magnesium. However, it may also be used for melting of metals of considerably higher melting point by suitably choosing the salt mixtures which are used for the development to have the desired melting points and specific gravities.

The salt mixtures which can be utilized in connection with the furnace of my invention are well understood in the art and are readily available. By way of example, the salt 2 in chamber 1 may be a eutectic mixture having the following salts:

| | Percent by weight |
|---|---|
| $BaCl_2$ | 55 |
| KCl | 25 |
| NaCl | 20 |

The melting point of the above eutectic mixture is 1008° F., and its density is 145 pounds per cubic foot at 1400° F. The metal aluminum weighs about 150 pounds per cubic foot at 1300° F., and is therefore of a greater specific gravity than the salt mixture.

For the salt 13 used for chamber 9 the following is given by way of example:

| | Percent by weight |
|---|---|
| $BaCl_2$ | 88 |
| KCl | 8 |
| NaCl | 4 |

The above mixture is not a eutectic mixture. It has a density of 175 pounds per cubic foot while in the molten state and therefore has a specific gravity greater than that of molten aluminum. The melting point of this non-eutectic mixture is 1250° F.

The invention in the present application is somewhat related to the invention described in my copending application, Serial No. 1,565, filed January 11, 1960.

It will be noted that the apparatus of the present invention utilizes a displacer 7 which is introduced into the molten salt only and does not contact with the molten metal itself. Thus, in the present invention, the ejection of the metal from the furnace is by means of the pressure of the salt bath 2 which pressure is developed by the rise in level by the introduction into the salt alone of the displacer 7.

The modified form of furnace illustrated in FIGURE 5 is similar to the furnace shown in FIGURE 2 except for the arrangement to prevent any possibility of inadvertent mixing of the lighter salt 2 with the heavier salt 13. In the modified construction, the well 9 has its salt containing bottom portion 18 at a lower level than is shown in FIGURE 2 and this arrangement permits the construction of the connecting passageway 8A to have a downward slope from well 1 toward well 9. The outlet end 19 of the passageway 8A, while lower than the well 1, connects into well 9 at a level above the salt level 20. Thus, any of the lighter salt 2 which might be inadvertently forced into the well 9 would not mix with the heavier salt 13 but would rise through the molten metal to the top of the chamber 9.

What I claim as my invention is:

1. A metal melting and pouring furnace comprising a ceramic body having therein a chamber containing a molten salt bath and also adapted to receive the metal to be melted by contact with said bath, the molten salt having a lower specific gravity than the molten metal so that the salt will float upon the metal occupying different vertical zones within said chamber, means for supplying electric energy to said salt bath sufficient to maintain it at a temperature considerably higher than that desirable in the molten metal for pouring, means for retaining the solid metal in the salt bath until melted and then permitting drainage to the zone beneath the salt a pouring spout having its inlet end above the normal upper level of said molten metal zone, and a channel in said body connecting the molten metal zone with the inlet end of said pouring spout and in which the molten metal is separated from the molten salt bath when at a desirably lower temperature than that of the bath.

2. The construction as in claim 1 in which said chamber has a support therein for temporarily arresting the solid metal within the bath until it is melted thereby avoiding mixing solid metal with previously melted metal in the lower zone.

3. A metal melting and pouring furnace comprising a chamber containing electrically heated molten material including molten metal and molten salt above said molten metal and together forming a hydrostatic column of predetermined height, a discharge spout for the molten metal having its entrance end above said column height and a displacement member insertable into the molten salt to raise the height of said column and thereby discharge through said spout molten metal equal in volume to that of the salt displaced by said displacement member.

4. A furnace as in claim 3 having a second chamber for the molten metal arranged intermediate the first chamber and said discharge spout and containing a lower layer beneath said molten metal of electrically heated molten salt of greater specific gravity than the molten metal.

5. A metal melting and pouring furnace comprising a ceramic body having laterally spaced chambers therein, one chamber containing an upper layer of electrically heated molten salt and a lower layer of molten metal, another chamber containing a lower layer of electrically heated molten salt and an upper layer of molten metal, a passageway connecting the molten metal layers in said first and second chambers, a discharge spout having its entrance end above the level of said molten metal, and a displacement member insertable into said upper layer of molten salt to thereby raise the level of the molten metal to the height of the entrance end of said spout.

6. In a furnace for melting metals wherein molten salt is the agent for supplying to the metal the heat necessary to melt it and to hold it in storage in a molten state, the combination of a series of chambers for containing the molten salt and metal with passageways through the walls separating said chambers, the molten salt in one of said chambers being heated by the passage of electric current therethrough, the molten metal in said chamber being of greater specific gravity than the said molten salt so that the molten salt floats thereon, said molten metal being of sufficient depth with respect to the opening of the passageway leading to the second chamber to float said salt above said passageway opening, said depth being maintained by the hydrostatic pressure of the molten metal in said second chamber, a displacement member adapted to be submerged in said float molten salt so as to effectively raise its level while floating on said molten metal in said first chamber thus increasing the total pressure of the molten salt on the molten metal in said first chamber causing metal to be discharged through said passageway from the said first chamber into said second chamber.

7. A metal melting and pouring furnace, as in claim 1, in which said channel includes second and third chambers, a passage extending into said second chamber from a location in said first chamber below the molten salt to thereby exclude passage of salt into said second chamber and a second passage for molten metal between said second chamber and said third chamber.

8. A furnace, as in claim 7, in which said second chamber contains a lower layer beneath the molten metal therein of electrically heated molten salt of greater specific gravity than the molten metal.

9. A furnace, as in claim 1, having a displacement member insertable into the upper layer of molten salt in said chamber to raise the height of the liquid therein causing a flow of molten metal through said channel to said pouring spout.

10. A furnace, as in claim 7, having a displacement member in the first-mentioned chamber insertable into the upper layer of molten salt therein to thereby discharge molten metal through said channel and through said second and third chambers into said pouring spout.

11. A furnace, as in claim 3, having a second chamber and a passage extending upwardly into said second chamber from a location in the first-mentioned chamber below the molten salt.

12. A metal melting and pouring furnace, as in claim 3, having a second chamber for the molten metal arranged intermediate the first chamber and said discharge spout and containing a lower layer beneath said molten metal of electrically heated molten salt of greater specific gravity than the molten metal, and a passageway from the first-mentioned chamber below the molten salt extending downwardly to said second chamber to a location above said lower layer of molten salt.

13. A metal melting furnace comprising a body having a pair of well chambers therein with a channel extending laterally between said wells to hydraulically connect the same, a bottom layer of fused salt of greater specific gravity than the metal to be melted, electrodes in said fused salt, means for passing current from said electrodes through said fused salt to provide the heat for melting, one of said wells containing an upper layer of molten metal, a discharge spout having its entrance end connected to said well at a point above the normal level of the molten metal therein, the other of said wells containing fused salt at the top thereof, a displacement member movable into the fused salt at the top of said other well, and means for moving said displacement member into said other well to raise the level of the liquid in both hydraulically connected wells and permit discharge of said upper layer of molten metal through said discharge spout.

References Cited in the file of this patent

UNITED STATES PATENTS

| 1,070,568 | Wile | Aug. 19, 1913 |
| 2,464,714 | Petersen | Mar. 15, 1949 |

FOREIGN PATENTS

| 565,590 | Great Britain | Nov. 16, 1944 |